(12) United States Patent
Pflüger et al.

(10) Patent No.: US 11,635,320 B2
(45) Date of Patent: Apr. 25, 2023

(54) MAGNETO-INDUCTIVE FLOW METER INCLUDING A DEVICE FOR CONTINUOUS QUANTITATIVE DETERMINATION OF THE DEGREE OF FILLING

(71) Applicant: Endress+Hauser Flowtec AG, Reinach (CH)

(72) Inventors: Stefan Pflüger, Munich (DE); Winfried Mayer, Buch (DE)

(73) Assignee: Endress+Hauser Flowtec AG, Reinach (CH)

( * ) Notice: Subject to any disclaimer, the term of this patent is extended or adjusted under 35 U.S.C. 154(b) by 365 days.

(21) Appl. No.: 17/042,613

(22) PCT Filed: Feb. 18, 2019

(86) PCT No.: PCT/EP2019/053935
§ 371 (c)(1),
(2) Date: Sep. 28, 2020

(87) PCT Pub. No.: WO2019/185240
PCT Pub. Date: Oct. 3, 2019

(65) Prior Publication Data
US 2021/0123786 A1    Apr. 29, 2021

(30) Foreign Application Priority Data
Mar. 28, 2018  (DE) ..................... 10 2018 107 450.6

(51) Int. Cl.
*G01F 23/28*  (2006.01)
*G01F 23/284*  (2006.01)
*G01F 1/60*  (2006.01)

(52) U.S. Cl.
CPC .............. *G01F 23/284* (2013.01); *G01F 1/60* (2013.01)

(58) Field of Classification Search
None
See application file for complete search history.

(56) References Cited

U.S. PATENT DOCUMENTS 6,198,424 B1   3/2001   Diede et al.
6,691,570 B1   2/2004   Neuhaus et al.
(Continued)

FOREIGN PATENT DOCUMENTS

CN      1592845 A      3/2005
CN    101929883 A     12/2010
(Continued)

*Primary Examiner* — Harshad R Patel
(74) *Attorney, Agent, or Firm* — Mark A. Logan; Endress+Hauser (USA) Holding, Inc.

(57) ABSTRACT

Disclosed is a device for measuring fill level of a liquid comprising: a measuring tube having a tube wall extending between first and second terminal openings and which surrounds a volume for guiding the liquid, wherein a tube axis extends between the two tube openings; a first conductor extending at least sectionally around the volume and is electrically insulated from the volume; a second conductor extending at least sectionally around the volume and is electrically insulated from the first conductor and from the volume, wherein the two conductors extend essentially in parallel with one another and form a waveguide for microwaves; an HF circuit for in-coupling a microwave signal into the waveguide and for receiving reflected microwave signals out-coupled from the waveguide; an operating and evaluating circuit for determining fill level of the liquid in the measuring tube based on received microwave signals.

13 Claims, 2 Drawing Sheets

(56) References Cited

U.S. PATENT DOCUMENTS

| | | | | |
|---|---|---|---|---|
| 7,368,922 | B2* | 5/2008 | Zangl | G01P 5/08 |
| | | | | 324/672 |
| 7,712,381 | B2* | 5/2010 | Allenberg | H01Q 1/38 |
| | | | | 73/861.12 |
| 8,266,970 | B2* | 9/2012 | Hencken | G01F 1/586 |
| | | | | 73/861.15 |
| 2003/0019291 | A1 | 1/2003 | Pchenikov et al. | |
| 2007/0090992 | A1* | 4/2007 | Edvardsson | G01F 23/284 |
| | | | | 342/124 |
| 2015/0241260 | A1* | 8/2015 | Voigt | G01F 23/00 |
| | | | | 340/612 |
| 2018/0328769 | A1* | 11/2018 | Hughes | G01S 7/411 |
| 2020/0309580 | A1* | 10/2020 | Godager | G01N 27/045 |
| 2021/0215527 | A1* | 7/2021 | Eriksson | G01S 13/103 |

FOREIGN PATENT DOCUMENTS

| | | |
|---|---|---|
| CN | 202041237 U | 11/2011 |
| CN | 103697952 A | 4/2014 |
| CN | 104685323 A | 6/2015 |
| DE | 2526860 A1 | 2/1976 |
| DE | 102004057087 B3 | 1/2006 |
| DE | 102005044143 A1 | 3/2007 |
| DE | 102007010627 A1 | 9/2008 |
| DE | 102007061573 A1 | 6/2009 |
| DE | 102010024680 A1 | 12/2011 |
| GB | 2501165 A | 10/2013 |
| WO | 2007046752 A1 | 4/2007 |

* cited by examiner

MAGNETO-INDUCTIVE FLOW METER INCLUDING A DEVICE FOR CONTINUOUS QUANTITATIVE DETERMINATION OF THE DEGREE OF FILLING

CROSS-REFERENCE TO RELATED APPLICATIONS

The present application is related to and claims the priority benefit of German Patent Application No. 10 2018 107 450.6, filed on Mar. 28, 2018, and International Patent Application No. PCT/EP2019/053935, filed on Feb. 18, 2019, the entire contents of which are incorporated herein by reference.

TECHNICAL FIELD

The present invention relates to a device for determining fill level of a liquid in a pipeline and to a flowmeter having such a device.

BACKGROUND

In different fields of application of flow measurement, there exist instances, where pipelines are not completely filled. This can be the case, for instance, in water/wastewater technology. Also in these pipelines, flow velocity of the fluid can be measured with the magneto-inductive measuring principle or comparable methods. In order, however, to calculate a volume flow from a measured flow velocity, it is necessary, supplementally, to have information concerning the fill level in the pipeline. Magneto-inductive flowmeters with a monitoring electrode for monitoring a degree of filling of the pipeline are disclosed in Offenlegungsschrifts DE 10 2010 001 993 A1 and DE 10 2012 109 308 A1. With the monitoring electrodes, however, it can only be determined, whether a pipeline is essentially completely filled. A continuous, quantitative determining of the degree of filling is not possible with the monitoring electrodes.

SUMMARY

It is, therefore, an object of the present invention to provide a remedy for this problem.

The device of the invention for measuring fill level of a liquid includes: a measuring tube for guiding the liquid, which measuring tube has a tube wall, which extends between a first tube opening at one end and a second tube opening at an opposite end and which surrounds a volume, in which the liquid is guided, wherein a tube axis extends between the first tube opening and the second tube opening; a first conductor, which extends at least sectionally around the volume, in which the liquid is guided, wherein the first conductor is electrically insulated from the volume; a second conductor, which extends at least sectionally around the volume, in which the liquid is guided, wherein the second conductor is electrically insulated from the first conductor and from the volume, wherein the first conductor extends essentially in parallel with the second conductor, wherein the first conductor and the second conductor form a waveguide for microwaves; an HF circuit for in-coupling a microwave signal into the waveguide and for receiving reflected microwave signals out-coupled from the waveguide; an operating- and evaluating circuit, which is adapted to determine fill level of liquid in the measuring tube based on received microwave signals.

In another development of the invention, the tube wall comprises a metal support body and an electrically insulating lining, wherein the support body surrounds the first conductor, and wherein the first electrical conductor is electrically insulated by the lining from the volume and from the support body.

In another development of the invention, the support body surrounds the second conductor, wherein the second electrical conductor is electrically insulated by the lining from the first conductor, from the volume and from the support body.

In another development of the invention, the second conductor comprises the support body and is especially formed by the support body.

In another development of the invention, the tube wall comprises an electrically insulating, tube wall body, wherein the waveguide surrounds the tube wall body and is electrically insulated from the volume by the tube wall body.

In another development of the invention, the first conductor and the second conductor are placed on the tube wall body.

In another development of the invention, the first conductor and the second conductor comprise metal strips, which are applied on the tube wall body.

In another development of the invention, the waveguide extends essentially perpendicularly to the tube axis.

In another development of the invention, the waveguide extends essentially helically around the volume.

In another development of the invention, the operating- and evaluating circuit is adapted to determine fill level of liquid in the measuring tube based on one or more reflected signals out-coupled from the waveguide.

In another development of the invention, the HF circuit is adapted to couple FMCW signals into the waveguide and to out-couple such from the waveguide.

The flowmeter of the invention includes a device of the invention for measuring fill level; and a measuring transducer for registering flow velocity of a liquid flowing in the measuring tube, wherein the measuring transducer is arranged in or on the measuring tube; and wherein the operating- and evaluating circuit is adapted to ascertain volume flow through the measuring tube based on flow velocity and fill level.

In another development of the invention, the measuring transducer comprises a magneto inductive measuring transducer.

In another development of the invention, the operating- and evaluating circuit is adapted to determine electric or dielectric properties of the liquid based on signals out-coupled from the waveguide, and to take into consideration such properties for determining flow velocity of the liquid.

BRIEF DESCRIPTION OF THE DRAWINGS

The invention will now be explained based on the examples of embodiments illustrated in the drawing, the figures of which show as follows.

DETAILED DESCRIPTION

Figure 1A:
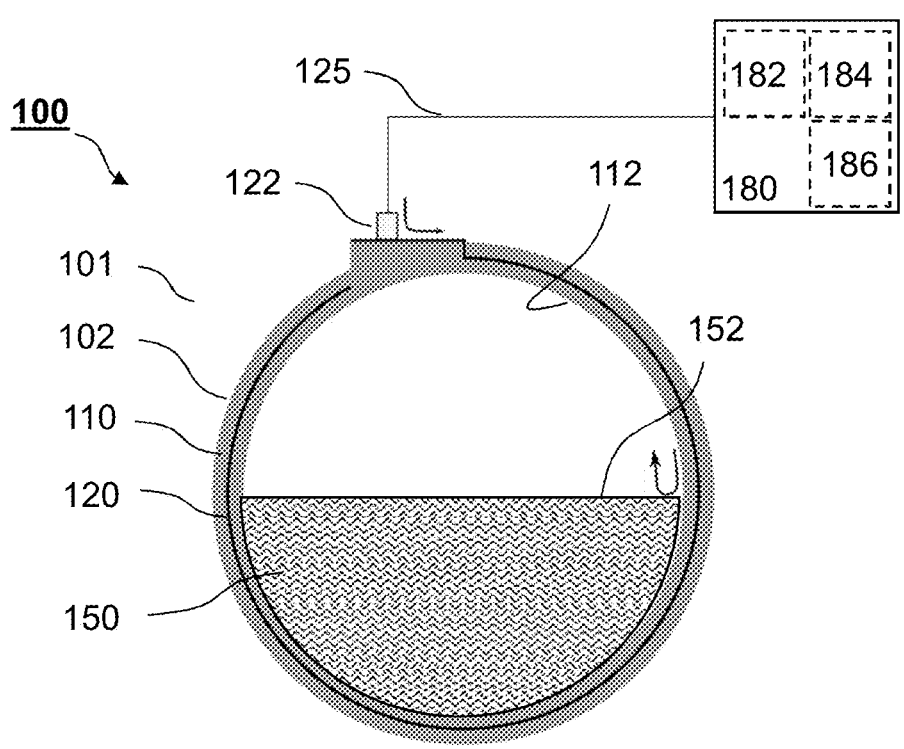
FIG. 1a shows a first cross section through a measuring tube of an example of an embodiment of a device of the present disclosure for measuring fill level of a liquid in the measuring tube.

As shown in FIG. 1a, the device 101 for measuring fill level of a liquid in an essentially horizontally extending measuring tube 102 includes a measuring tube wall 110, which here is of an electrically insulating material, for example, a ceramic material, a glass or a polymer, such as PEEK, polyamide, PVC. The device additionally includes a conductor structure 120 having, extending essentially parallel with one another, at least two electrical conductors 120, which are electrically insulated from one another and from the volume 112 of the measuring tube and, in the plane of the cross section or parallel thereto, are led almost completely around the volume 112 of the measuring tube 102. The conductors 120 can especially comprise metal bands, for example, copper bands, which especially are embedded in the insulating material of the measuring tube wall 110. A first end of the conductor structure 120 is arranged near the high point of the measuring tube 102, where a coaxial connector socket 122 is connected to the conductor structure, in order to be able to couple a microwave signal line 125 with the conductor structure. When microwaves are coupled into the conductor structure 120, these interact with the media contained in the volume 112 of the measuring tube. In the case of a partial filling of the volume 112 with an aqueous medium 150, an impedance jump occurs on the surface 152 of the aqueous medium 150, so that a microwave coupled into the conductor structure is partially reflected there. The microwave signal line 125 is connected with an electronics unit 180, which includes, on the one hand, an HF circuit 182 for producing microwave signals and, on the other hand, an operating- and evaluating circuit 184, which is equipped to determine the fill level of a medium in the measuring tube based on the travel time of the partially reflected microwave signals. The HF circuit can especially be equipped to produce an FMCW signal, wherein the fill level is then determined based on travel time dependent frequency differences between a currently transmitted signal and a received, reflected signal.

In order to prepare the device for measurement operation, for example, the following procedure can be used:

First, an empty measurement is performed with the measuring tube 102 filled completely with air. The reflection signals arising in such case are not caused by a reflection on the fill level. The result of this empty measurement is stored in the frequency domain as $s_{11,empty}(f)$.

Then, a full measurement is performed with the measuring tube 102 completely filled with water. The reflected signal is registered and stored as $s_{11,full}(f)$.

After a transforming of $s_{11}(f)$ from the frequency domain to $s_{11}(t)$ in the time domain by Fourier transformation, undesired reflection signals are removed by forming the complex valued difference between $s_{11}(f)$ and $s_{11,empty}(f)$.

Finally, the time position of the fill level dependent reflection for the maximum filled case is ascertained. In this way, the prerequisites for measuring fill level are put in place.

In measurement operation after registering the reflection $s_{11}(f)$, firstly, undesired reflection signals are eliminated by forming the complex valued difference between $s_{11}(f)$ and $s_{11,empty}(f)$. Transformation of $s_{11}(f)$ from the frequency domain to $s_{11}(t)$ in the time domain by Fourier transformation follows. Then, the time position of the fill level dependent reflection compared with the position of the measurement in the case of the full measurement tube 102 is ascertained, and, as a function of the time position, a fill level is calculated. This fill level can be taken into consideration for calculating a volume flow.

Figure 1B:
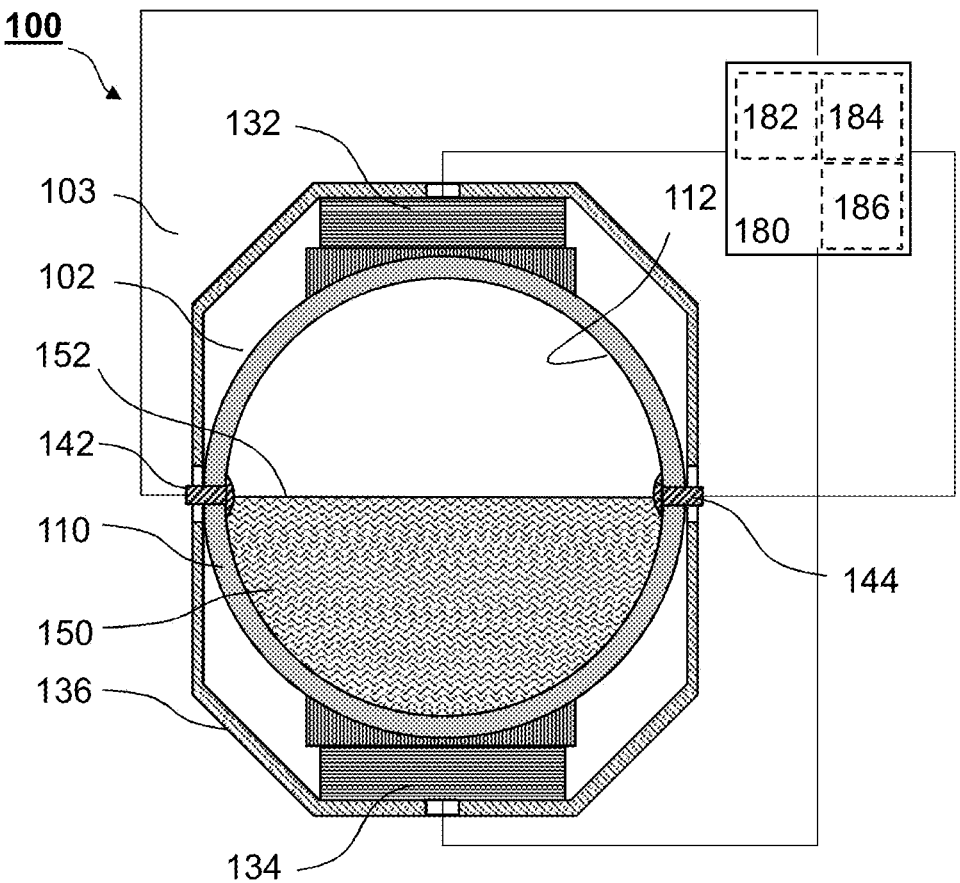
FIG. 1b shows a second cross section through the measuring tube axially spaced from the first cross section in FIG. 1a, wherein components for flow measurement are arranged in the second measuring tube cross section.

FIG. 1b presents an axially displaced cross section through the measuring tube 102 of FIG. 1a. This cross section intersects components for volume flow measurement by means of the magneto-inductive measuring principle. For producing a magnetic field passing through the measuring tube 102 essentially perpendicularly to the measuring tube axis, the flowmeter 100 includes a magneto-inductive measuring transducer 103. The measuring transducer 103 includes two field coils 132, 134 with pole shoes adjoining the measuring tube 102 and arranged lying opposite one another above and below the measuring tube 102. A field guide-back sheet metal arrangement 136 couples the rear faces of the field coils 136 together outside of the measuring tube. The measuring transducer 103 further includes, arranged on a horizontally extending diameter arc two oppositely lying measuring electrodes 142, 144 that are equipped to register a velocity dependent and magnetic field dependent, induced measurement voltage U=v x B, as long as the measuring electrodes 142, 144 are contacted by a conductive medium 150 located in the measuring tube 102. The field coils 132, 134 and the measuring electrodes 142, 144 are connected to the electronics unit 180, which further has a power supply unit 186, which is adapted to supply the field coils 132, 134 with an alternating coil current. The operating- and evaluating circuit 184 is further adapted to register the measurement voltage applied to the measuring electrodes 142, 144 and to ascertain a flow velocity based on this, as well as to determine a value for volume flow based on flow velocity and the ascertained fill level in the measuring tube 102.

Figure 2A:
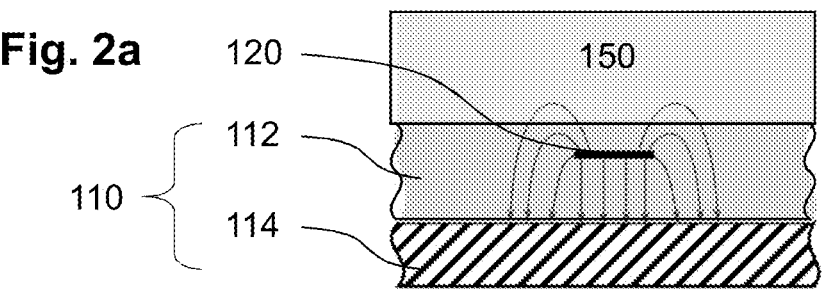
FIG. 2a shows a detail of a longitudinal section through a measuring tube wall of a first example of an embodiment of a device of the present disclosure for measuring fill level of a liquid in the measuring tube.
Figure 2B:
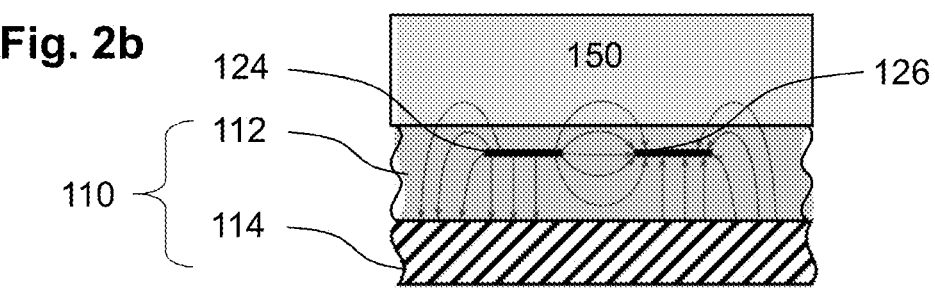
FIG. 2b shows a detail of a longitudinal section through a measuring tube wall of a second example of an embodiment of a device of the present disclosure for measuring fill level of a liquid in the measuring tube.
Figure 2C:
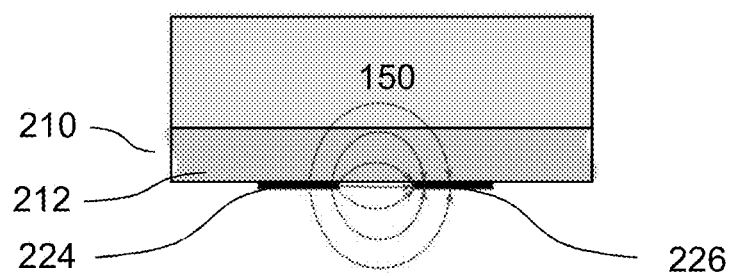
FIG. 2c shows a detail of a longitudinal section through a measuring tube wall of a third example of an embodiment of a device of the present disclosure for measuring fill level of a liquid in the measuring tube.

FIGS. 2a to 2c are detailed longitudinal sections through the measuring tube wall 110 of various forms of embodiment of the device of the invention, wherein the conductor arrangements, in each case, extend perpendicularly to the longitudinal sections. The measuring tube axis extends, in each case, in the plane of the longitudinal sections.

The measuring tube wall shown in FIG. 2a includes a metal support body 114, which is formed, for example, in an investment casting process. The support body 114 is coated on its inner side with an electrically insulating and media inert lining 112, which comprises a synthetic material, for example, a polyurethane. Embedded in the lining 112 is a band shaped metal conductor, for example, a copper band 120, which extends in the lining around the volume of the measuring tube and forms with the support body 114 a waveguide, which is contactable with a microwave signal, which is led between the copper band 120 and the support body 114. As shown by the field lines in the drawing, the microwave signal also interacts with a medium 150 located in the volume of the measuring tube, so that there occurs on surfaces of the medium 150, where there are abrupt changes of the dielectric constant, a (partial) reflection of the microwave signal.

The measuring tube wall 110 shown in FIG. 2b likewise includes a metal support body 114, which is formed, for example, in an investment casting process. The support body 114 is coated on its inner side with an electrically insulating and media inert lining 112, which comprises a synthetic material, for example, a polyurethane. Embedded in the lining 112 are two mutually parallel, band shaped metal conductors, for example, in the form of copper bands 124,126, which extend parallel to one another in the lining 112 around the volume of the measuring tube and form a waveguide, which is contactable with a microwave signal, which especially is led between the two copper bands 124, 126. As shown in the drawing by the field lines, the microwave signal also interacts with a medium 150 located in the volume of the measuring tube, so that there occurs on surfaces of the medium 150, where there are abrupt changes of the dielectric constant, a (partial) reflection of the microwave signal. In comparison with FIG. 2a, here the interaction with the medium 150 is stronger, so that the partial reflection is greater.

The measuring tube wall 210 shown in FIG. 2c comprises an electrically insulating, tube wall body 212 of synthetic material, for example, a polyamide, PVC, PEEK or PES, which, in given cases, is fiber reinforced. Arranged on the outside of the tube wall body 212 are two mutually parallel, band shaped, metal conductors, for example, in the form of copper bands 224, 226, which extend around the volume of the measuring tube and are contactable with a microwave signal, which is led between the two copper bands 224, 226. As shown by the field lines in the drawing, the microwave signal also interacts with a medium 150 located in the volume of the measuring tube, so that there occurs on surfaces of the medium 150, where there are abrupt changes of the dielectric constant, a (partial) reflection of the microwave signal.

The above examples show that any conductor arrangements led around the volume of the measuring tube are suitable for guiding a microwave signal, which interacts with a medium located in the volume of the measuring tube, and therewith make the surfaces of the medium detectable based on partial reflections of the microwave signal.

As a result, the fill level in a measuring tube can be ascertained therewith, in order also to be able to calculate a correct volume flow measured value in the case of partially filled measuring tubes.

The invention claimed is:

1. A device for measuring a fill level of a liquid, comprising:
    a measuring tube for guiding the liquid, the measuring tube having a tube wall extending between a first tube opening at one end and a second tube opening at an opposite end and which surrounds a volume, in which the liquid is guided, wherein a tube axis extends between the first tube opening and the second tube opening;
    a first conductor extending at least sectionally around the volume in which the liquid is guided, wherein the first conductor is electrically insulated from the volume;
    a second conductor extending at least sectionally around the volume in which the liquid is guided, wherein the second conductor is electrically insulated from the first conductor and from the volume, wherein the first conductor extends in parallel with the second conductor, wherein the first conductor and the second conductor form a waveguide for microwaves;
    a high-frequency (HF) circuit for in-coupling a microwave signal into the waveguide and for receiving reflected microwave signals out-coupled from the waveguide; and
    an operating and evaluating circuit adapted to determine the fill level of the liquid in the measuring tube based on received microwave signals.

2. The device as claimed in claim 1, wherein the tube wall includes a metal support body and an electrically insulating lining, wherein the support body surrounds the first conductor, and wherein the first electrical conductor is electrically insulated by the lining from the volume and from the support body.

3. The device as claimed in claim 2, wherein the support body surrounds the second conductor, and wherein the second electrical conductor is electrically insulated by the lining from the first conductor, from the volume, and from the support body.

4. The device as claimed in claim 2, wherein the second conductor is formed by the support body.

5. The device as claimed in claim 1, wherein the tube wall includes an electrically insulating tube wall body, wherein the waveguide surrounds the tube wall body and is electrically insulated from the volume by the tube wall body.

6. The device as claimed in claim 5, wherein the first conductor and the second conductor are placed on the tube wall body.

7. The device as claimed in claim 6, wherein the first conductor and the second conductor includes metal strips applied on the tube wall body.

8. The device as claimed in claim 1, wherein the waveguide extends perpendicularly to the tube axis.

9. The device as claimed in claim 1, wherein the waveguide extends helically around the volume.

10. The device as claimed in claim 1, wherein the operating and evaluating circuit is adapted to determine the fill level of the liquid in the measuring tube based on one or more reflected signals out-coupled from the waveguide.

11. The device as claimed in claim 1, wherein the HF circuit is adapted to couple FMCW signals into the waveguide and to out-couple FMCW signals from the waveguide.

12. A flowmeter, comprising:
    a device for measuring fill level, including:
        a measuring tube for guiding a liquid, the measuring tube having a tube wall extending between a first tube opening at one end and a second tube opening at an opposite end and which surrounds a volume, in which the liquid is guided, wherein a tube axis extends between the first tube opening and the second tube opening;
        a first conductor extending at least sectionally around the volume in which the liquid is guided, wherein the first conductor is electrically insulated from the volume;
        a second conductor extending at least sectionally around the volume in which the liquid is guided and in parallel with the first conductor, wherein the second conductor is electrically insulated from the first conductor and from the volume, wherein the first conductor and the second conductor form a waveguide for microwaves;
        a high-frequency (HF) circuit for in-coupling a microwave signal into the waveguide and for receiving reflected microwave signals out-coupled from the waveguide; and an operating and evaluating circuit adapted to determine a fill level of the liquid in the measuring tube based on received microwave signals; and a magneto-inductive measuring transducer for determining a flow velocity of a liquid flowing in the measuring tube, the measuring transducer including:

a first field coil and a first pole shoe, wherein the first field coil and its pole shoe adjoin the measuring tube above the measuring tube;

a second field coil and a second pole shoe, wherein the second field coil and its pole shoe adjoin the measuring tube below the measuring tube and wherein the second field coil and its pole shoe are disposed opposite the first field coil and its pole shoe;

a first electrode disposed on a horizontal diameter of the measuring tube and embodied to contact the flowing liquid; and a second electrode disposed on the horizontal diameter of the measuring tube and opposite the first electrode and embodied to contact the flowing liquid, wherein the operating and evaluating circuit is adapted to ascertain a volume flow through the measuring tube based on the flow velocity and the fill level.

13. The flowmeter as claimed in claim 12, wherein the operating and evaluating circuit is further adapted to determine electric or dielectric properties of the liquid based on signals out-coupled from the waveguide, and to take into consideration such properties for determining flow velocity of the liquid.

\* \* \* \* \*